Sept. 10, 1968           R. D. RISNER           3,401,373

VEHICLE WARNING AND ALARM SYSTEM

Filed Oct. 24, 1965           2 Sheets-Sheet 1

INVENTOR
RAY D. RISNER
BY
*Lucke & Lucke*

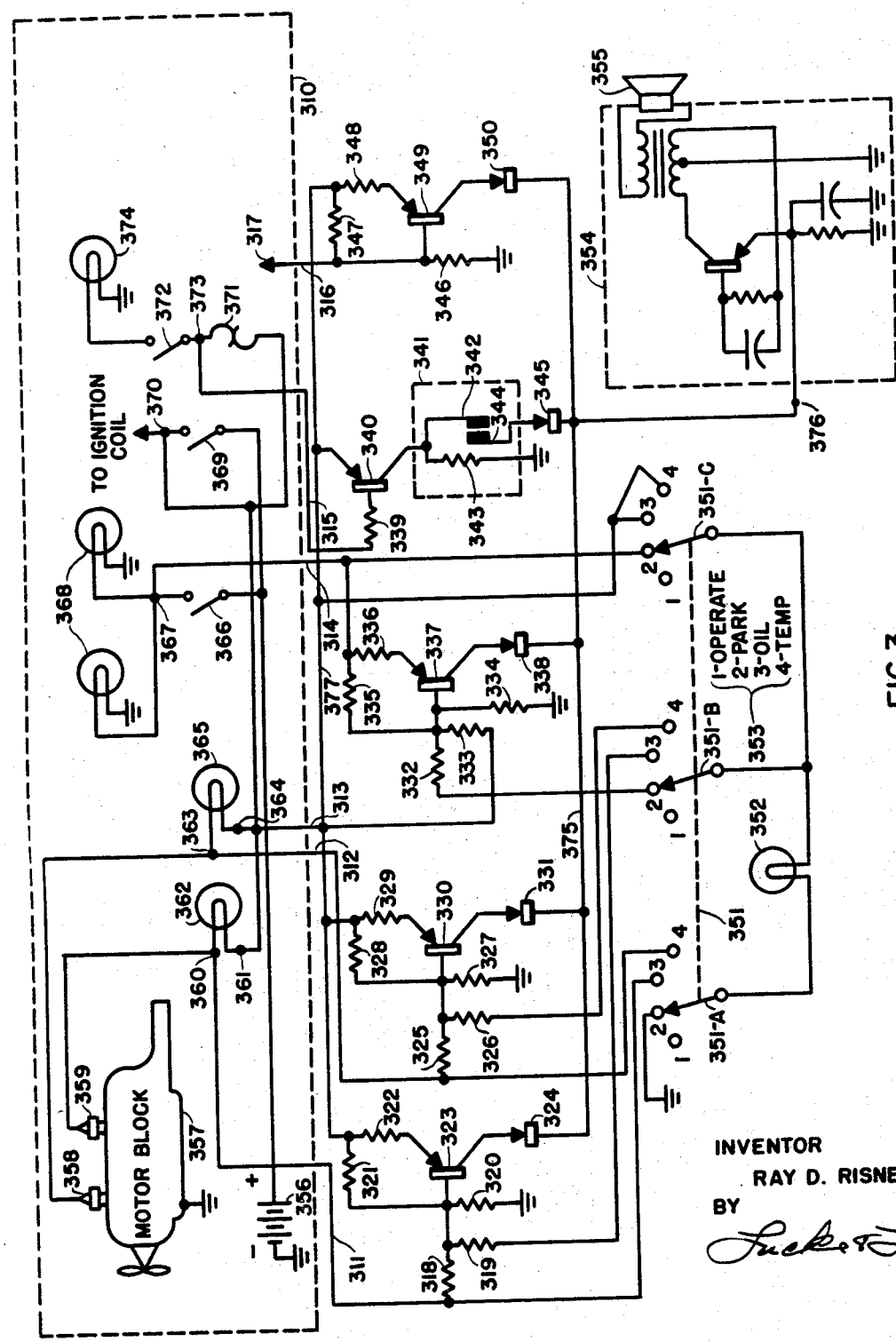

3,401,373
Patented Sept. 10, 1968

3,401,373
VEHICLE WARNING AND ALARM SYSTEM
Ray D. Risner, 174 Ampere Ave.,
Oakhurst, N.J. 07755
Filed Oct. 24, 1965, Ser. No. 504,480
8 Claims. (Cl. 340—52)

ABSTRACT OF THE DISCLOSURE

This invention discloses an electronic audible alarm system utilizing transistors and transistor switching means. The system is attachable to any vehicle having a chargeable electrical source, to indicate a multiplicity of malfunctions and operable conditions such as open warning lights, high water temperature, low oil pressure, prolonged delay turn signals, etc.

---

This invention relates to an automatic warning and analyzing device which is applicable to any equipment using warning light indicators and a power supply therefor. More particularly it relates to using transistorized switches to perform one or more monitoring functions in warning and alarm systems for use on automobile, marine and airplane engines, but is not restricted to such use.

The device will be described and illustrated relative to its use on automobiles. When the device is installed on an automobile having standard equipment including a storage battery, headlights, warning lights to indicate low oil pressure and high water temperature, etc., turn signals with associated flasher equipment and/or other similar indicating appurtenances, it will immediately indicate to the driver by an automatically emitted audible warning sound if: a warning light bulb burns out, the oil pressure drops to a dangerous level, the water temperature rises above a dangerous level, the emergency brake is applied while the engine is running, the battery is discharging due to headlights being on and the engine off, and/or the turn signals remain on too long after a turn has been completed.

A warning light in a conventional warning device covering any of the above mentioned functions may burn out or become nonoperative, the device to which the invention pertains, however, will remain operative in its capability to monitor any combination of the above listed malfunctions, i.e., its operation will not be affected by one or more burned out warning lights. This gives greater protection to the wearing parts of a vehicle and reliable warning to the driver of the existence of a dangerous condition in the vehicle.

This reliable device has the further advantage of being able to audibly warn the driver whenever a malfunction exists without requiring him to risk taking his eyes off the road and periodically check the dashboard for possible warning light indications.

In addition to the above enumerated warning signals incorporated in this alarm system, the invention also includes an analyzer feature having a switching circuit with associate interconnections and a flashing indicating light. If a warning light is burned out, the driver is alerted by the audible signal and turns the analyzer switch until the warning signal is silenced. When a signal-silencing position is reached, the pointer on this switch will indicate the monitoring circuit in which the warning light is defective.

The analyzer feature also allows the driver to check the condition of a warning light in the warning system by turning this switch to the appropriately marked contact to visually determine by the flashing of its indicating lamp whether or not the warning light under inspection is in operative condition.

In addition to monitoring headlights when left on after the engine is turned off and the battery starts to discharge, the audible warning signal may be silenced or defeated at the election of the driver. For instance, where a vehicle is not permitted to be parked at night without its lights turned on and the driver does not wish to have an audible signal operating for such period of time, a defeat circuit may be used to silence the sound by turning the switch to an appropriately indexed position such as PARK. While the switch is in this defeat position, associated indicating lamp will flash to visually remind the driver that such silent condition is still in effect.

Further features and advantages of the invention will be apparent in the following detail description and the accompanying drawings which illustrate preferred embodiments of the invention, wherein:

FIG. 3 is a similar schematic diagram of the system shown in FIG. 2 with a multiplicity of the additional monitoring circuitry shown therein together with a defeat circuitry and a combined analyzer and monitor system checking switch.

Figure 1:
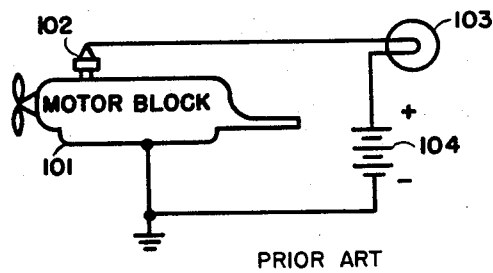
FIG. 1 is a schematic diagram of a conventional warning light indicating system such as used on a typical modern automobile.

Referring now to the drawings, a conventional warning light indication system such as used on a typical modern automobile is shown in FIG. 1 where the electrical circuit extends from a contact device 102 to an incandescent indicating warning lamp 103 to a battery 104 and thence grounded on motor block 101. Device 102, which closes under high water temperature, or low oil pressure if connected to the engine, is known in the automotive industry as a "sender." If the water temperature rises above a predetermined level, sender 102 closes and warning lamp 103 lights up. If by any chance lamp 103 opens due to a malfunctioning of the filament or for any other reason, the subsequent operation of sender 102 is voided because warning light 103 is not operating and the system fails to warn the driver of a dangerously high temperature in the cooling system.

Figure 2:
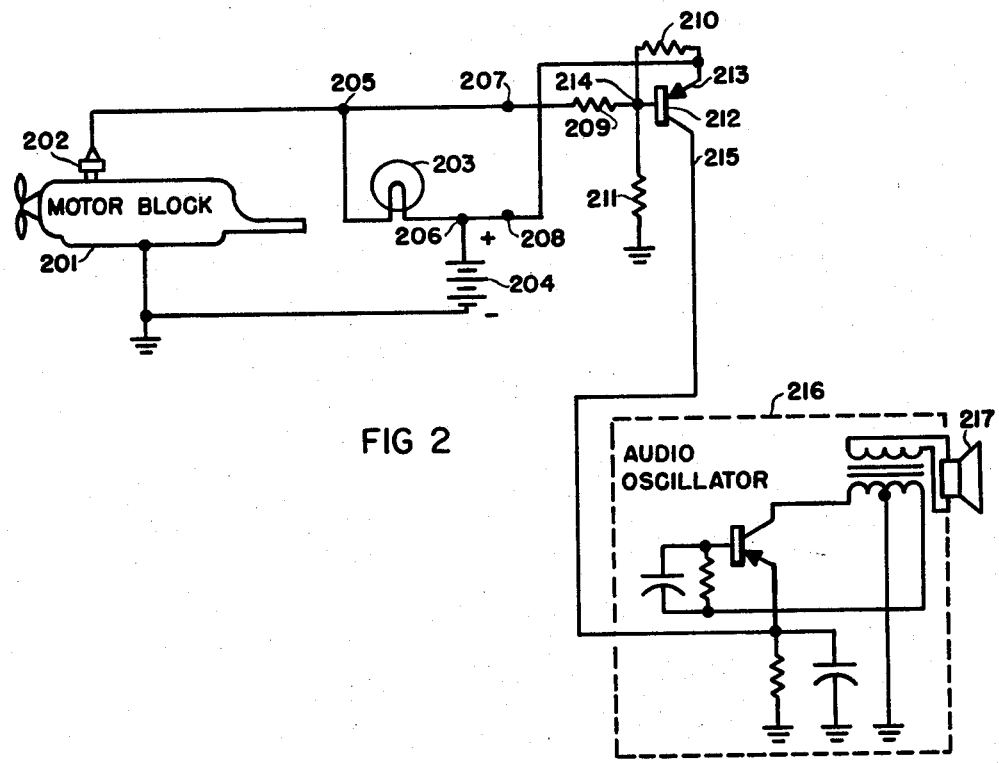
FIG. 2 is a schematic diagram of the system shown in FIG. 1 with additional circuitry for a constant audible warning system according to the present invention.

FIG. 2 shows essentially the same warning light indicating system as in FIG. 1 with the exception that additional circuitry, including elements 207–217 forming the audible warning system, is connected thereto. PNP transistors are used and shown in this particular application of the invention because the battery 204 connections are grounded on the negative side. NPN transistors would be utilized for positive grounded battery connections.

A PNP transistor 212 is hooked up with certain associated components and functions as a solid state switch to operate either in the "off" or "on" mode. Resistor 210, connected between the emitter 213 and base 214 of transistor 212, furnishes a back-bias. Resistor 211, connected from base 214 to ground functions as a forward-bias component which makes it possible for transistor 212 to conduct in a forward mode. Resistor 209 is connected between base 214 and junction 205 through conductor 207. Resistor 209 when connected as shown, applies a hold-off bias to base 214. The source of this bias will hereinafter be described. The junction between resistor 210 and emitter 213 is connected through conductor 208 to junction 206 of warning lamp 203.

If sender 202 is not closed due to normal water temperature, warning light 203 does not turn on. In this condition the voltage drop across 203 is negligible and the same voltage and polarity appears across points 205 and 206. This same voltage condition appears at emitter 213 through conductor 208 and resistor 210. The same voltage also appears at base 214 through conductor 208 and hold-off bias resistor 209. Due to the fact that both emitter 213 and base 214 have essentially the same voltage and polarity, this transistor will not conduct. As a result no voltage will appear between collector 215 and ground and, due to this lack of voltage, audio oscillator 216 does not function and speaker 217 is silent.

Removal or opening of warning lamp 203 results in a loss of hold-off bias at point 214, thereby allowing resistor 211 to act as the total forward-bias component. As a result, transistor 212 saturates or reduces its internal resistance to an insignificant value and allows practically the full potential to appear from point 215 to ground. This potential is sufficient to operate item 216, the audible alarm signal device, thereby emitting an audible signal from speaker 217. Item 216 is a standard audio oscillator circuit utilizing a transistor in a common emitter circuit with feed-back between its collector and base.

If by chance sender 202 operates or closes due to high water temperature, warning lamp 203 may operate or not, but hold-off bias through resistor 209 is closed through motor block 201 to ground, essentially placing resistor 209 in parallel with forward biasing resistor 211, which in turn causes transistor 212 to conduct in its forward mode allowing a maximum or sufficient voltage to appear between collector 215 and ground, i.e., across the terminals of audio oscillator 216 which becomes operative and in turn is audible from speaker 217. The quantity of current required to operate oscillator 216 is of the same magnitude as that passing through transistor 212 when the latter is conducting in its forward mode.

Referring now to FIG. 3, which delineates a completely integrated warning system for a typical automobile by embodying a multiplicity of transistor switches 323, 330, 337, 340 and 349, the general function of which is the same as above described relative to switch 212. However, the transistor switches in FIG. 3 are wired in such a manner that each operates to monitor a constituent part of an automobile, indicated generally in dotted lines as 310. Such components as headlights 368, directional lamp signals 374, storage battery 356, motor block 357 and other appurtenances are connected to the warning system by conductors 311–316, inclusive.

As an example of how the device operates, it is assumed that ignition switch 369 is closed with the engine running and light switch 366 is closed with head lamps 368 turned on. When this condition obtains and no malfunction of the motor occurs, such as low oil pressure or high temperature, or in other words, senders 358 and 359 are normally open and warning lamps 362 and 365 are in working order, equal voltages of the same polarity will appear at the junction points 360, 361, 363 and 364. Transistor 323, which monitors the oil sending circuit, including sender 359, is connected so as to monitor any change of voltage across lamp 362 at junctions 360 and 361. Such change of voltage may occur in the form of an open warning light or a turned on warning light. The latter condition may be caused by some malfunction of engine 357 such as low oil pressure which causes sender 359 to close and complete the battery circuit through warning light 362 to the engine block 357 and common ground circuit.

Junction 360 is connected to the base of transistor 323 through conductor 311 and resistor 318. Junction 361 is connected to the emitter of transistor 323 via conductor 313 and through temperature compensating resistor 322. As previously mentioned, a condition of equilibrium or off-mode for a transistor connected as here shown and in FIG. 2, will occur when the base and emitter have essentially the same polarity and magnitude of voltage. This condition occurs when the warning light 362 is not ON or not open, resulting in the aforementioned equal voltages existing at points 360 and 361, which in turn presents equal voltages of the same polarity at the base and emitter of transistor 323. In consequence, no voltage appears between the collector of 323 and ground, or point 376 and ground, rendering audio oscillator 354 inoperative.

Diode 324 is an isolation device connected as shown between the collector of transistor 323 and the common conductor 375 to prevent stray leakage currents from other conducting transistors that feed this common conductor from backing up into transistor 323. Diode 324 thus effects a minimum of cross-talk.

If, however, warning lamp 362 is ON and sender 350 closes as a result of oil pressure loss, resistor 318 is grounded through the motor block placing this resistor essentially in parallel with the forward biasing resistor 329. The voltage is therefore lowered at the base of 323 causing this transistor to conduct. As a result, a voltage will appear at its collector and also on conductor 375 and at point 376 resulting in sufficient voltage to make audio oscillator 354 operative and in turn be audible on speaker 355.

Another condition which will cause transistor 323 to conduct is when warning lamp 362 opens. When this condition occurs and sender 359 is open, the voltage at junction 360 will be at a lower voltage than junction 361, which will have a maximum voltage. This same lower voltage will appear at the base of transistor 323 and the maximum voltage will appear at the emitter. Under this condition, transistor 323 will conduct and a sufficient voltage will appear at point 376 making audio oscillator 354 and speaker 355 operative.

Transistor switch 330 and associated components serve to monitor the temperature indicating circuits of vehicle 310 and functions in an identical manner as described in the previous paragraphs relative to switch 323. These associated components are illustrated in the drawings as resistors 325, 326, 327, 328 and 329, conductor 313, diode 331, conductor 375 and the same point 376, audio oscillator 354 and speaker 355. The components involved in this section of the monitoring system are warning lamp 365, reference voltage points 363 and 364, temperature sender 358, associated motor block 357, the common ground return, and storage battery 356.

Transistor switch 337 serves as a headlight warning or reminder circuit, the purpose of which is to warn the driver that the headlights 368 are on, especially when used on dark or foggy days, when the engine is turned off to park the car, thus preventing any unnecessary battery drain. The driver will be immediately warned that the headlights are on as soon as ignition switch 369 opens to turn off the motor when a tone signal will be emitted from audio oscillator 354 and speaker 355 which will remind the driver to turn light switch 366 off.

The condition of transistor 337 in its off-mode will occur when light switch 366 and ignition switch 369 are both closed. In this situation equal voltages of the same polarity will appear at junction 367 and 370 respectively. These two equal voltages will appear at the emitter and base of transistor 337 simultaneously. The voltage at junction 370 follows thae path going through conductor 313, then through resistor 333, and subsequently to the base of transistor 337. The voltage appearing at junction 367 follows the path through conductor 314, through temperature compensating resistor 336 and finally to this emitter. The base and emitter, both having the same voltage and polarity, will permit no forwarding current to pass through transistor 337. When ignition switch 369 is opened, the voltage at the base of 337 will fall to a value below the emitter voltage which results in turning the transistor "on," allowing transistor 337 to pass current from its emitter to its collector. This current passes through isolating diode 338 and into the common bus 375. A voltage will now appear between points 376 and ground which is sufficient to make audio oscillator 354 operative and cause speaker 355 to emit a tone. Resistor 335 connected between the base in this circuit and the junction of resistor 336 serves as a back-bias for transistor 337.

Transistor switch 340 serves in conjunction with thermal time delay switch 341 as a monitor for the vehicle turn-signal system. The combination provides a delayed audible warning if the directional signal switch is inadvertently left on for an extended period after a turn is completed. Thermal flasher 371 is normally closed when vehicle 310 is not operating. If turn-signal 372 is closed completing the circuit from battery 356 through closed switch 369 and thence to one or more turn-signal lamps 374, the current drawn through the flasher heats up the bimetal elements therein, causing the flasher to open momentarily and lamps 374 to extinguish. When the bimetal elements in the flasher cool off, it closes again, thus turning signal lamps 374 on. This cycle of on and off operation is repeated, and as a result, the voltage appearing at junction 373 is likewise on and off at the same rate as the flasher cycle. This pulsed voltage is transmitted through conductor 315 through limiting resistor 339, and thence to the base of transistor 340. Since switch 369 is in closed position, equal voltage of the same polarity will appear at the emitter of 340.

When the flasher 371 is opened, a forward biasing circuit is formed by the combination of resistor 339, through closed switch 372 and the resistance of the lamp to ground. This condition turns transistor 340 on. When flasher 371 is closed, equal voltages of the same polarity will be presented at the base and emitter of 340 simultaneously, turning this transistor off. Repeated cycles of on and off current will pass through the collector at the same rate, and thence through the thermal time delay device 341 via the heating coil 343, which is in close juxtaposition to bimetal member 342, bending said member to cause a closure with contact 344. The circuit is then completed from the collector of transistor 340 through isolating diode 345 and thence to audio oscillator 354 which operates to emit a tone from speaker 355. In this case, however, the tone signal will be pulsed in the same rate that flasher 371 turns on and off. The rate of delay, before pulsed audible tone is heard after turn signal switch 372 is turned on can be adjusted by changing the spacing between the contact on bimetal member 342 and contact 344.

Transistor switch 349 and associated components 346, 347, 348 and isolating diode 350 provide for additional alarm or sensing circuits for vehicle 310 through conductor 316 and attachment lead 317. Such attachment lead may be connected to any sensor device or switch which it may be desirable to monitor.

The analyzer feature is illustrated in the lower left portion of FIG. 3. Switch 351 and flashing indicating lamp 352 with associated wiring are the main components of this feature. Four numbered positions of this switch are provided for each arm 351A, 351B, 351C and identified in tabulation 353 as 1, OPERATE; 2, PARK; 3, OIL; and 4, TEMPERATURE. When the switch is in the first position, all of the previously described features are in operation, i.e., the analyzer is in readiness to function in all phases of alarm activity. If for example a malfunction occurs in vehicle 310 such as a burned out oil warning lamp 362, a tone is emitted from speaker 355 reminding the driver to manipulate switch 351 through the other three positions until the tone is silenced. In this case the sound would cease at the third position marked OIL, indicating that lamp 362 is open.

If warning lamp 362 is intact and the warning tone still sounds and cannot be nullified by turning switch 351 to any of the four dialed positions it will be found that when the switch is at one of these positions a flashing indicating lamp 352 will be activated to flash continuously as a constant visual reminder that the oil pressure is dangerously low. The driver is thereby notified to shut the engine off or take other suitable means to correct this serious condition. The same procedure would apply if the temperature sender 358 and/or warning lamp 365 are malfunctioning.

The position marked PARK in tabulation 353 is for the purpose of defeating the headlight warning feature so that a car can be parked with the lights on and motor off without emittance of the constant audible warning signal. In this instance, lamp 352 would flash continuously serving as a constant reminder that this silent condition exists and that the driver should restore switch 351 to the first or OPERATE position to monitor vehicle 310 according to normal procedure.

The operating sequences of the analyzer are as follows: When switch 351 is in the first position the alarm circuit is in readiness to monitor all functional circuits. When switch 351 is in the second position with headlights 368 on and ignition switch 369 open, transistor 337 would normally be turned on to effect a warning signal. However, a hold-off bias is applied to the base of this transistor through resistor 332 via switch arm 351B. This bias is a voltage derived from point 367 through conductor 314 via contact number 2 and contact arm 351C. Switch arm 351A is connected to its associated contact number 2 and thence to ground which thereby completes the circuit to operate flashing indicating lamp 352.

When analyzer switch 351 is in the third position, transistor 323 will be monitored to determine if it is turned on or off. If the transistor is turned on due to an open warning lamp 362, a positive bias is applied to its base via resistor 318 which turns transistor 323 off and keeps audio oscillator 354 silent. Indicating lamp 352 will not flash when warning lamp 362 is open. If, however, sender 359 closes due to low oil pressure, the transistor is not only turned on, but indicating lamp 352 will flash because the latter will have a completely closed circuit. This closed circuit starts from junction 370 through conductor 313 and thence to contact 3 which joins associated arm 351C through indicating lamp 352 through contact arm 351A joining associated contact 3 and thence via conductor 311 and ground through closed sender 359.

When switch 351 is in the fourth position transistor 330 will be monitored in an identical manner as above described relative to transistor 323, sender 359, and warning lamp 362. Monitoring of transistor 330 will include that of sender 358 and warning lamp 365 also.

I claim:
1. A combination for use in a vehicle having crankcase oil, a cooling liquid, turn signal lamps, headlights, a chargeable power source, an audio oscillator circuit with associated speaker, transistor switches capable of being operated in the OFF mode and in the ON mode, said transistor switches connected in series with said circuit to conduct in said ON mode to emit an audible signal from said speaker, said combination including an electrical indicating system connected to said circuit, said system having a first low level oil sender with a first warning light, a second high temperature liquid sender with a second warning light, a thermal time delay switch connected to said turn signal lights, a first of said transistor switches connected to said first sender and said first warning light, a second transistor switch connected to said second sender and said second warning light, a third transistor switch connected to said delay switch and a fourth transistor switch connected to said headlights, wherein malfunction of said first warning light and closing of said first sender energizes said first transistor to activate said circuit to emit said signal; malfunction of said second warning light and closing of said second sender energizes said second transistor switch to activate said circuit to emit said signal; said delay switch energizing said third transistor switch to activate said circuit and emit said signal when said turn signal lamps continue to light a predetermined time after the indicated turn of said vehicle is completed; and said headlights energizing said fourth transistor switch to activate said circuit to emit said signal upon discharging of said power source.

2. A combination according to claim 1, including an analyzer circuit having a multiple switch and a flashing indicating lamp to identify the source of malfunction indicated by said audible signal, one of the contacts in said multiple switch being selectively connected to at least one of said first, second, third or fourth transistor switches in said oscillator circuit, whereby upon emission of said signal said analyzer switch is turned from the first of said contacts to each successive contact until said signal ceases upon connection with the monitoring transistor switch in which said malfunction exists.

3. A combination according to claim 2, in which said indicating lamp will flash when said analyzer switch is connected to a transistor in which a sender is closed.

4. A combination according to claim 2, wherein said indicating lamp will flash and said audible signal will cease upon said multiple switch connecting with said fourth transistor switch when energized by said headlights discharging said power source.

5. For use in a vehicle having a chargeable power source, a combination comprising a visual electrical warning system connected to said source, said system consisting of at least one sender switch and associated warning light, an audible alarm signal device having an audio oscillator circuit and associated speaker, a transistor having a base, emitter and collector electrodes used in the switching mode, said signal device connected to said collector electrode and energized upon conduction of said transistor, conducting and resistance means connecting said emitter and base in parallel with said warning light, whereby the same electrical potential appears at both said emitter and said base electrodes to maintain said transistor in its OFF mode during normal operation of said warning system, and whereby operation of said sender upon occurrence of a malfunction monitored by said warning system, applies different potentials to said emitter and base electrodes to forward bias said transistor into its ON mode thereby energizing said signal device to emit an audible alarm from said speakers.

6. A combination according to claim 5, wherein malfunction of said warning light applies different potentials to said emitter and base electrodes to forward bias said transistor into its ON mode, thereby energizing said signal device to emit an audible alarm from said speaker.

7. In combination with a vehicle having a chargeable power source, turn signal lamps and associated flasher lamp switch, an audio oscillator circuit and associated speaker connected with said flasher switch, and a thermal bimetal time delay switch, said combination including a transistor switch capable of being operated in the OFF mode and in the ON mode, said transistor switch being connected in series with said circuit to conduct in said ON mode to emit an audible signal from said speaker, said transistor switch monitoring prolonged lighting of said signal lamps and said flasher switch, said flasher switch energizing said transistor switch to activate said circuit and emit said signal with a delay effected by said thermal delay switch when said signal lamps continue to flash a predetermined time after the indicated turn of said vehicle is completed.

8. A combination according to claim 7, wherein said transistor has base, emitter and collector electrodes and said delay switch is provided with heater wires and contacts therefor, resistance means connecting said base electrode to the lamp side of said flasher switch, whereby repeated opening of said flasher switch causes conduction of said transistor by lowering the voltage of said base relative to that of said emitter, thus energizing said collector and heating said wires to close said contacts, and whereby a nonenergized turn signal lamp in its off interval connects said base circuit to ground causing the transistor to conduct, thereby operating said signal device which emits pulsed alarm signals in synchronism with the repeated openings of said flasher switch.

References Cited
UNITED STATES PATENTS 3,256,461    6/1966    Foreman et al. _____ 315—129

JOHN W. CALDWELL, *Primary Examiner.*

ALVIN WARING, *Assistant Examiner.*